US006746982B2

(12) United States Patent
Hertel et al.

(10) Patent No.: US 6,746,982 B2
(45) Date of Patent: Jun. 8, 2004

(54) POROUS CARBON BODY FOR A FUEL CELL HAVING AN ELECTRONICALLY CONDUCTIVE HYDROPHILIC AGENT

(75) Inventors: Christopher J. Hertel, Wethersfield, CT (US); John A. S. Bett, Hampden, CT (US); Foster P. Lamm, South Windsor, CT (US); Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 341 days.

(21) Appl. No.: 10/034,884

(22) Filed: Dec. 27, 2001

(65) Prior Publication Data

US 2003/0124414 A1 Jul. 3, 2003

(51) Int. Cl.$^7$ .......................... B01J 21/18; B01J 31/00; C01B 31/00; D01F 9/12; C01D 3/00
(52) U.S. Cl. ................ 502/180; 502/150; 502/159; 423/445 R; 423/447.1; 423/448; 423/449.1; 252/511
(58) Field of Search ................ 502/180, 150, 502/159; 423/448, 449.1; 106/31.6, 476; 252/511

(56) References Cited

U.S. PATENT DOCUMENTS

| 4,094,897 | A | * | 6/1978 | Nagasawa et al. ........... 264/105 |
| 4,582,632 | A | * | 4/1986 | Rokujo et al. .............. 252/502 |
| 4,835,074 | A | * | 5/1989 | Bolster et al. ................ 429/43 |
| 4,920,017 | A | * | 4/1990 | Herscovici .................... 429/42 |
| 4,957,593 | A | * | 9/1990 | Shaw et al. .................. 204/291 |
| 5,803,959 | A | | 9/1998 | Johnson et al. |
| 5,840,414 | A | | 11/1998 | Bett et al. |
| 5,885,335 | A | | 3/1999 | Adams et al. |
| 5,942,347 | A | | 8/1999 | Koncar et al. |
| 6,024,848 | A | | 2/2000 | Dufner et al. |
| 6,258,476 | B1 | | 7/2001 | Cipollini |
| 6,336,965 | B1 | * | 1/2002 | Johnson et al. ............. 106/31.6 |
| 6,645,287 | B2 | * | 11/2003 | Nguyen et al. ............. 106/473 |
| 2003/0042205 | A1 | * | 3/2003 | Gaudet et al. ............. 210/656 |
| 2003/0091891 | A1 | * | 5/2003 | Yoshida et al. ............. 429/44 |

* cited by examiner

Primary Examiner—Mark L. Bell
Assistant Examiner—Patricia L. Hailey
(74) Attorney, Agent, or Firm—Malcolm J. Chisholm, Jr.

(57) ABSTRACT

The invention is a porous carbon body for a fuel cell having an electronically conductive hydrophilic agent and method of manufacture of the body. The porous carbon body comprises an electronically conductive graphite powder in an amount of between 60%–80% by weight of the body; a carbon fiber in an amount of between 5%–15% by weight of the body; a thermoset binder in an amount of between 6%–18% by weight of the body; and, a modified carbon black electronically conductive hydrophilic agent in an amount of between 2%–20% by weight of the body. The body provides for increased wettability without any decrease in electrical conductivity, and also provides for an efficient manufacture without any need for high temperature, costly steps to graphitize the body, or to incorporate post molding hydrophilic agents into pores of the body.

12 Claims, 3 Drawing Sheets

US 6,746,982 B2

POROUS CARBON BODY FOR A FUEL CELL HAVING AN ELECTRONICALLY CONDUCTIVE HYDROPHILIC AGENT

TECHNICAL FIELD

The present invention relates to electrochemical cells such as fuel cells that are suited for usage in transportation vehicles, portable power plants, or as stationary power plants, and the invention especially relates to a porous carbon body that may be used within a fuel cell for transporting reactant, product and coolant fluids to, through and from the fuel cell, for conducting electricity from one cell to an adjacent cell, for providing a fluid barrier to gaseous reactants, for defining gaseous reactant distribution channels, and/or for providing mechanical integrity to the fuel cell.

BACKGROUND OF THE INVENTION

Fuel cells are well-known and are commonly used to produce electrical energy from reducing and oxidizing reactants fluids to power electrical apparatus such as apparatus on-board space vehicles, or on-site generators for buildings. A plurality of planar fuel cells are typically arranged in a stack surrounded by an electronically insulating frame structure that defines manifolds for directing flow of reducing, oxidant, coolant and product fluids as part of a fuel cell power plant. Each individual fuel cell generally includes an anode electrode and a cathode electrode separated by an electrolyte. A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

It is known to utilize one component of a fuel cell to assist in the accomplishment of a variety of water management and related tasks. Such a component is typically formed of a porous carbon body and is commonly referred to under various names including "cooler plate", "water transport plate", "separator plate", "bi-polar plate", "end plate", among other names. For example, in U.S. Pat. No. 6,024,848 that issued on Feb. 15, 2000 to Dufner et al., which patent is owned by the assignee of all rights in the present invention and which patent is hereby incorporated herein by reference, a water transport plate is shown that defines a plurality of coolant water feed channels on a planar surface of the plate and on an opposed surface a network of reactant gas distribution channels is defined.

Such a water transport plate is a typical porous carbon body and the plate must perform a variety of functions. It must transport water from coolant channels through the body to gaseous reactant channels to humidify a reactant fluid within the gas reactant channels; it must remove product water generated at the cathode electrode across the body into the coolant water channels to prevent flooding of the cathode electrode; it must form a gaseous barrier to prevent mixing of fuel and oxidant reactant fluids on opposed sides of the plate; it must conduct electricity or electrons from one cell to an adjacent fuel cell in a fuel cell stack assembly; it must conduct waste heat generated at the cathode away from the cathode to the coolant fluid; it may provide a distribution network for oxidant and reducing fluid reactants; and, it must provide mechanical support and integrity to the fuel cell.

Therefore, a porous carbon body that makes up such a water transport plate must be porous, wettable to water, have a high rate of water permeability, have a high bubble pressure, be a good electrical and thermal conductor, have good compressive and flexural strength, and the porous carbon body must be chemically stable in the environment of an operating PEM fuel cell. Some of these qualities require characteristics that are inconsistent with characteristics appropriate for other such qualities. For example, to increase bubble pressure to thereby enhance a gaseous seal between gaseous oxidant and fuel reactants on opposed sides of the porous carbon body, it is appropriate to have a small mean pore size of the pores within the body. However, to enhance permeability of the body to coolant or product water, it is desirable to have a large mean pore size. Similarly, a high porosity, or percent open pore volume, is appropriate for enhancing flow of water through the porous carbon body, however a high porosity is detrimental to both electrical conductivity and mechanical strength.

Known porous carbon bodies utilized in fuel cells have been designed to reconcile such differing requirements. For example, it is known to render pores of a carbon body hydrophilic through incorporation of a hydrophilic rendering compound onto an interior surface of the pores, wherein the compound is a low solubility metal, such as shown in U.S. Pat. No. 6,258,476 that issued on Jul. 10, 2001 to Cipollini, which patent is owned by the assignee of all rights in the present invention and which patent is hereby incorporated herein by reference. In U.S. Pat. No. 5,840,414 that issued on Nov. 24, 1998 to Bett et al., which patent is owned by the assignee of all rights in the present invention and which patent is hereby incorporated herein by reference, a porous carbon body is shown that achieves increased wettability by incorporation of a metal oxide into the pores of the body, wherein the metal oxide has a solubility in water of less than about $10^{-6}$ moles per liter. While Bett et al. makes the porous carbon body more hydrophilic, the process described in Bett includes a costly, and time consuming treatment to a graphitized carbon body. Normal manufacture of graphitized carbon bodies includes a very high temperature, lengthy process in order to produce a crystallized graphite structure. For example, to graphitize a mixture of a graphite powder and a resin into a porous carbon body acceptable for use in a PEM fuel cell, it is known to first compress the mixture in a mold to establish a pre-determined porosity at about 100–500 pounds per square inch ("p.s.i.") and at about 325–375 degrees Fahrenheit ("° F."), and to then heat the molded body in an inert atmosphere at about 3,600–5,400° F. As can be easily understood, such a process is quite expensive and time consuming often taking several weeks, and hence is a substantial problem in providing a cost effective porous carbon body for a PEM fuel cell.

Another approach to producing a porous carbon body for a PEM fuel cell is disclosed in U.S. Pat. No. 5,942,347 that issued on Aug. 24, 1999 to Koncar et al. wherein the body is described as a "bi-polar separator plate". The plate includes 50% to about 95% by weight of a preferably carbonaceous "electronically conductive material", at least 5% by weight of a resin, and at least one hydrophilic agent wherein the conductive material, resin and hydrophilic agent are substantially uniformly dispersed throughout the separator plate. In formation of the Koncar et al. plate, the hydrophilic or wetting agent is mixed together with the electronically conductive material and resin to produce a "uniform dispersion" of the wetting agent, and the mixture is then molded into a plate at 500–4,000 p.s.i. and 250–800° F. The hydrophilic or wetting agent is an oxide of titanium, aluminum or silica. Unfortunately however, the oxides of those substances are electronic insulators. Therefore, as shown in FIG. 2 of Koncar et al., as the amount of the hydrophilic agent is increased, the conductivity of the resulting porous carbon body decreases. Hence, the carbon body of Koncar et al. necessarily results in a compromise between enhancing electrical conductivity of the body and making the body wettable to water. To increase wettability of the Koncar et al. porous carbon body, electrical conductivity must be decreased.

Accordingly, there is a need for a porous carbon body for a fuel cell that may be efficiently manufactured, and that in rendering the body adequately wettable to water does not decrease electrical conductivity of the body.

DISCLOSURE OF THE INVENTION

The invention is a porous carbon body having an electronically conductive hydrophilic agent and method of manufacture of the body for usage in an electrochemical cell such as a fuel cell. The porous carbon body comprises an electronically conductive graphite powder in an amount of between 60%–80% by weight of the body; a carbon fiber in an amount of between 5%–15% by weight of the body; a thermoset binder in an amount of between 6%–18% by weight of the body; and, a modified carbon black electronically conductive hydrophilic agent in an amount of between 2%–20% by weight of the body, the modified carbon black being carbon having attached at least one organic group, the organic group including at least one aromatic group or a $C_1$–$C_{12}$ alkyl group, and the organic group also including at least one ionic group, one ionizable group, or a mixture of an ionic group and an ionizable group wherein the ionic or the ionizable group is a sulfonic acid or a salt thereof, wherein the at least one aromatic group or $C_1$–$C_{12}$ alkyl of the organic group is directly attached to the carbon, and the organic group is present at a level of from about 0.10 to about 4.0 micromoles/$m^2$ of the carbon used based on the nitrogen surface area of the carbon; and, wherein the body has a mean pore size of greater than 2.0 microns, and an open porosity of greater than 25%.

The porous carbon body having an electronically conductive hydrophilic agent may be efficiently made by mixing together an electronically conductive graphite powder in an amount between 60%–80% by weight of the mixture, a carbon fiber in an amount of between 5%–15% by weight of the mixture, a thermoset binder in an amount of between 6%–18% by weight of the mixture, and the modified carbon black electronically conductive hydrophilic agent in an amount between 2%–20%; then simultaneously compressing and heating the mixture in a mold at a pressure of between 250–1,000 p.s.i. and at a temperature of between 300° F.–450° F. for between 1–30 minutes to form a body having a mean pore size of greater than 2.0 microns and an open porosity of greater than 25%.

By mixing a thermoset binder with the graphite, carbon fiber, and modified carbon black in the aforesaid proportions, compressing and heating the mixture into a molded porous carbon body having a mean pore size greater than 2.0 microns and an open porosity greater than 25%, the porous carbon body of the present invention may be efficiently manufactured without the known costly and time consuming high temperature heating undertaken to graphitize many known porous carbon bodies used in fuel cells, and without a time consuming and costly step of treating a porous carbon body after molding with a hydrophilic rendering compound. The resulting porous carbon body also exhibits appropriate bubble pressure, water permeability, electrical conductivity, thermal conductivity, compressive and flexural strength to efficiently serve as a water transport plate, separator plate or related component of a PEM fuel cell operating at 1,000–2,000 ASF for a very long time period.

Accordingly, it is a general object of the present invention to provide a porous carbon body for an electrochemical cell such as a fuel cell having an electronically conductive hydrophilic agent for a fuel cell and a method of manufacture of the body that overcomes deficiencies of prior art porous bodies for fuel cells.

It is a more specific object to provide a method of manufacturing a porous carbon body having an electronically conductive hydrophilic agent for a fuel cell without a time consuming, high temperature treatment to graphitize the body, and without a post molding step of treating the body with a hydrophilic rendering agent.

It is yet another object to provide a porous carbon body for a fuel cell having an electronically conductive hydrophilic agent that may serve as a water transport plate, a reactant fluid separator plate, a reactant flow field plate, and/or an end plate between fuel cells.

It is still a further object to provide a porous carbon body for a fuel cell having an electronically conductive hydrophilic agent that is highly wettable by water formed during operation of the fuel cell and/or by coolant water passing through the fuel cell.

It is another specific object to provide a porous carbon body for a fuel cell having an electronically conductive hydrophilic agent that has an extended useful life and does not degrade during operation of the fuel cell over long time periods.

These and other objects and advantages of this invention will become more readily apparent when the following description is read in conjunction with the accompanying drawings.

DESCRIPTION OF THE PREFERRED EMBODIMENTS

Figure 1:
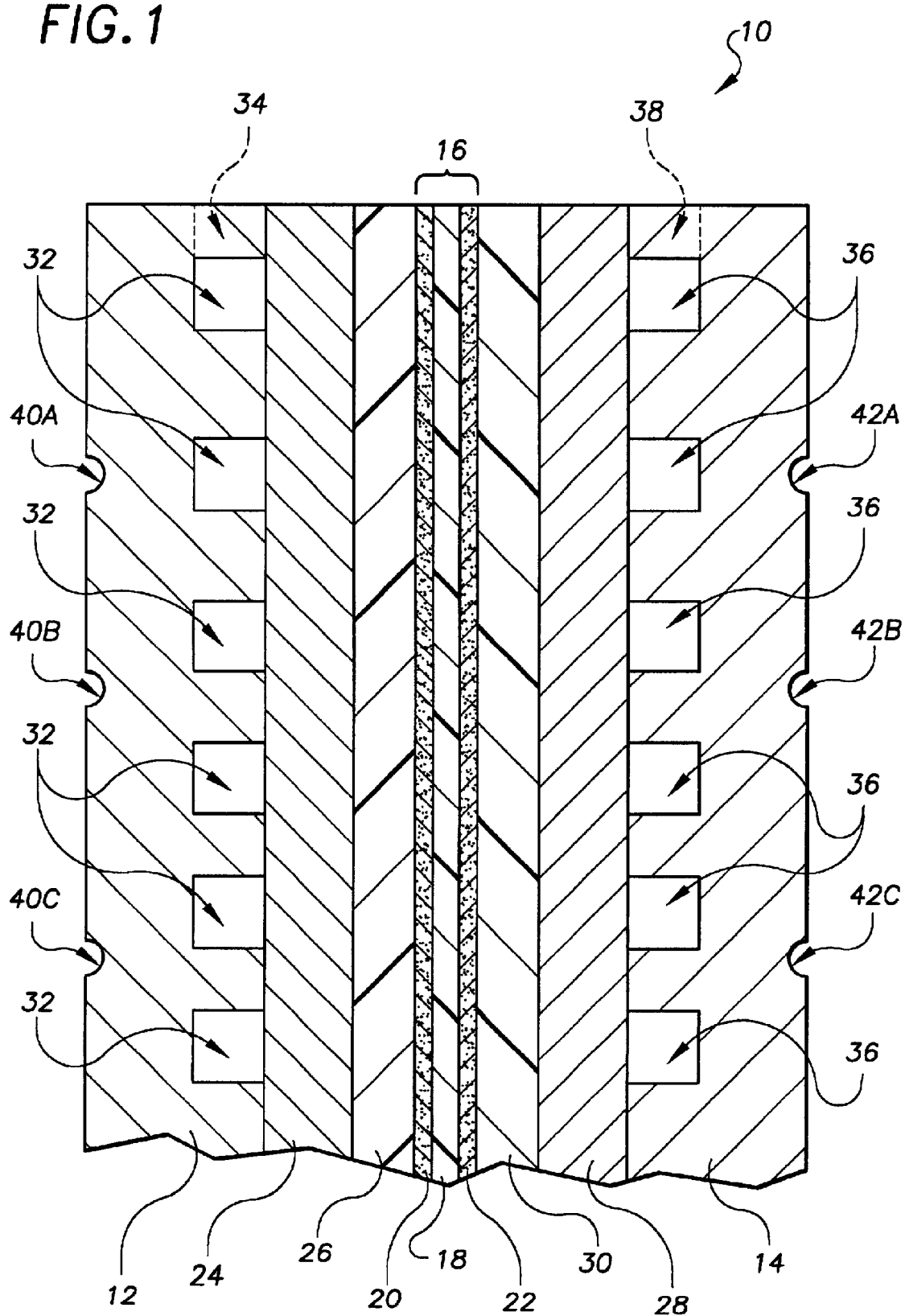
FIG. 1 is a cross-sectional, schematic representation of a fuel cell employing a porous carbon body having an electronically conductive hydrophilic agent constructed in accordance with the present invention.

Referring to the drawings in detail, FIG. 1 shows a schematic, cross-sectional representation of an electrochemical cell such as a fuel cell means for generating electrical energy from process oxidant and reducing fluid reactant streams that is generally designated by the reference numeral 10. The fuel cell 10 has a porous carbon body constructed in accordance with the present invention in the form of a first or anode water transport plate 12 and a second or cathode water transport plate 14. The anode and cathode water transport plates 12, 14 are at opposed sides of the fuel cell 10, which includes a membrane electrode assembly ("M.E.A.") 16 that consists of an electrolyte such as a proton exchange membrane ("PEM") 18, an anode catalyst 20 and a cathode catalyst 22 secured on opposed sides of the electrolyte 18.

The fuel cell 10 may also include an anode support means that is secured between and in fluid communication with the anode catalyst 20 and the anode water transport plate 12 for passing a reducing fluid or fuel stream adjacent the anode catalyst 20. The anode support means may include one or more porous layers, any one or all of which may be wetproofed, as is well known in the art, such as a porous anode substrate 24 and a porous anode diffusion layer 26. Similarly, the fuel cell may also include a cathode support means that is secured between and in fluid communication with the cathode catalyst 22 and the cathode water transport plate 14 for passing a process oxidant stream adjacent the cathode catalyst 22. The cathode support means may include one or more porous layers, any one or all of which may be wetproofed, as is well known in the art, such as a porous cathode substrate 28, and a porous cathode diffusion layer 30. As described in the aforesaid U.S. Pat. No. 6,024,848, the anode and cathode support means may be one or more layers of carbon—carbon fibrous composites that may be wetproofed with a hydrophobic substance such as "Teflon", in a manner well-known in the art.

The anode water transport plate 12 defines a plurality of fuel flow channels 32 that are in fluid communication with each other and with a fuel inlet 34 that receives the reducing fluid so that the fuel inlet 34 and flow channels 32 cooperate to pass the reducing fluid fuel through the fuel cell 10 in fluid communication with the anode catalyst 20. Similarly, the cathode water transport plate 14 defines a plurality of oxidant flow channels 36 that are in fluid communication with each other and with an oxidant inlet 38 that receives the process oxidant so that the oxidant inlet 38 and oxidant flow channels 36 cooperate to pass the process oxidant through the fuel cell 12 in fluid communication with the cathode catalyst 22. It is pointed out that the plurality of fuel flow channels 32 are often characterized as an "anode flow field" secured adjacent the anode catalyst. Similarly, the plurality of oxidant flow channels 36 may be characterized as a "cathode flow field".

In alternative fuel cell means, the anode and cathode flow fields may be formed instead by cavities, differing channels or grooves well known in the art and defined within fuel cell components to direct the fuel and oxidant reactant streams to pass adjacent the anode and cathode catalysts 20, 22. The anode water transport plate 12 also includes a plurality of anode coolant channels 40A, 40B, 40C that deliver and remove a coolant stream to and from the plate 12, and similarly, the cathode water transport plate 14 includes a plurality of cathode coolant channels 42A, 42B, 42C that deliver and remove a coolant stream to and from the plate 14. As shown in FIG. 1, the anode and cathode water transport plates 12, 14 may be structured to cooperate with adjacent water transport plates (not shown) of adjacent fuel cells in a fuel cell stack assembly (not shown), so that the anode coolant channels 40A, 40B, 40C may cooperate in mirror-image association with coolant channels in water transport plates of an adjacent fuel cell (not shown) to form a network of coolant channels for delivering a coolant stream to the anode and cathode water transport plates 12,

14. Additionally, as is well known in the art, as pores in the anode and cathode water transport plates 12, 14 become filled with liquid from the coolant stream, such as water or an antifreeze solution, or with product water generated by the fuel cell 10 during operation, the plates 12, 14 become impermeable to gaseous movement and thus form a gas barrier or seal so that the reducing fluid and process oxidant streams do not mix.

In operation of the fuel cell 10, the fuel flow channels direct the stream of hydrogen rich reducing fluid to pass through pores of the anode substrate 24 and anode diffusion layer 26 and to thereby contact the anode catalyst 20 so that the hydrogen electrochemically reacts at the anode catalyst 20 to form protons which pass through the PEM 18 to electrochemically react with oxygen at the cathode catalyst 22 to form product water. The product water must be removed from the cathode diffusion layer 30 and substrate 28 and oxidant flow channels 36 at a sufficient rate to avoid flooding of the cathode catalyst 22 and thereby permit adequate oxidant to continue flowing into contact with the cathode catalyst 22. Consequently, the cathode water transport plate 14 must have appropriate pore volume, pore size and wettability to permit the aforesaid movement of the product liquid water from the cathode support means through the plate 14 into the cathode coolant channels 42A, 42B, 42C, and to simultaneously support movement of the cooling fluid from the cathode coolant channels 42A, 42B, 42C through the plate 14 and into the oxidant flow channels 36 to humidify the oxidant stream. The cathode water transport plate 14 must also be chemically stable in the acidic environment of the operating PEM fuel cell 10 for a long term (exceeding for example 10,000 hours of operation for an automotive application, and as much as 40,000 hours for a stationary application); the plate 14 must be capable of withstanding mechanical compressive loads necessary for sealing an ordinary cell stack assembly, such as 50–200 p.s.i.; and, the plate must have adequate flexural strength to be capable of withstanding varying handling requirement for manufacture and cell stack assembly of the fuel cell 10, such as approximately 1,000 p.s.i.

To satisfy such operating requirements, the cathode water transport plate 14 and the anode water transport plate 12 are therefore porous carbon bodies constructed in accordance with the present invention. Such an improved porous carbon body formed into the cathode or anode water transport plate 14, 12 that satisfies the aforesaid and other important requirements includes an electronically conductive graphite powder in an amount of between 60%–80% by weight of the body; a carbon fiber in an amount of between 5%–15% by weight of the body; a thermoset binder in an amount of between 6%–18% by weight of the body; and, a modified carbon black electronically conductive hydrophilic agent in an amount of between 2%–20% by weight of the body, the modified carbon black being carbon having attached at least one organic group, the organic group including at least one aromatic group or a $C_1$–$C_{12}$ alkyl group, and the organic group also including at least one ionic group, one ionizable group, or a mixture of an ionic group and an ionizable group wherein the ionic or the ionizable group is a sulfonic acid or a salt thereof, wherein the at least one aromatic group or $C_1$–$C_{12}$ alkyl of the organic group is directly attached to the carbon, and the organic group is present at a level of from about 0.10 to about 4.0 micromoles/m² of the carbon used based on the nitrogen surface area of the carbon, wherein the body has a mean pore size of greater than 2.0 microns, and an open porosity of greater than 25%.

The modified carbon black electronically conductive hydrophilic agent described above is disclosed and described in detail in U.S. Pat. No. 5,803,959, that issued on Sep. 8, 1998 to Johnson et al., which patent is incorporated herein by reference. In particular, the "modified carbon product" described above and utilized by the inventors of the present invention is disclosed in that patent and described in claims 1 and 4, as being the described modified carbon product (claim 1) wherein the ionic or the ionizable group attached to the carbon is a sulfonic acid or salt thereof (claim 4). The Johnson et al. Patent describes manufacture and usage of the modified carbon product primarily as an improved ink for aqueous and non-aqueous formulations. However, the inventors of the invention disclosed and claimed herein have found that use of the modified carbon products within a porous carbon body for a fuel cell produced unexpected and highly desirable benefits wherein the modified carbon product serves as a carbon black electronically conductive hydrophilic agent.

A first test example of a preferred embodiment of the porous carbon body was prepared by mixing in a blender for approximately five minutes: 37.5 weight percent ("wt %") graphite powder available under the product designation "KS75" available from the Timcal Company, of Bodio, Switzerland; 37.5 wt % graphite powder available under the product designation "KS150" also from the Timcal company; 12.5; 12.5 wt % phenolic resin powder as the thermoset binder available under the product designation "VARCUM 29302" from the Durez Company, of Dallas, Tex., U.S.A.; 10 wt % milled carbon fiber available under the product designation "PANEX 30" from the Zoltek Company, of St. Louis, Mo., U.S.A.; and, 2.5 wt % of the above described modified carbon black electronically conductive hydrophilic agent available under the product designation "Grade 6387-5" from the Cabot Company of Boston, Mass., the assignee of the Johnson et al. Patent.

A second test example was fabricated that was the same as the first test example except that the weight percent of the modified carbon black was increased to 5 wt %, and the weight percent of the graphite powder was correspondingly reduced from 75 wt % to 72.5 wt %. A third test example was also fabricated that was the same as the first test example, except that the weight percent of the modified carbon black was increased to 10 wt %, and the weight percent of the graphite powder was correspondingly reduced to from 75 wt % to 67.5 wt %.

The test examples were manufactured by mixing the components of each test example in a blender for approximately 5 minutes; and then the mixture was loaded into a 4.5" by 4.5" steel mold cavity to achieve a uniform thickness. A male mold detail was then placed within the cavity, and the mold was placed within an hydraulic compression press with heated platens. The mold was heated in the press to an ultimate temperature of 400° F. at a pressure of 500 p.s.i. for about 30 minutes, and then the mold was cooled to room temperature. A porous carbon body was thereby produced having a thickness of approximately 0.085". A "baseline" example of a porous carbon plate was also made for comparative tests with the three test examples. The baseline plate included the same components and was fabricated by the same method, but without the modified carbon black electronically conductive hydrophilic agent. Equal amounts of the two graphite powders ("KS75" and "KS150") were added to the baseline porous carbon plate to compensate for the missing weight percent of the modified carbon black.

To determine benefits of the varying amounts of the modified carbon black on performance, 2", by 2" specimens were cut from the three test and baseline examples for wetting experiments. A "dry" weight was recorded for each specimen. The same 2" by 2" specimens were utilized for through plane electrical resistivity measurements. Flexural strength specimens measuring 0.5" by 3" were also cut from the baseline and first test example and tested in a 4-point flexure test.

The ability of each of the specimens to absorb water under a natural or "wick" fill was determined by suspending the specimens vertically in a beaker, slowly filling the beaker with distilled water, and keeping the specimens submerged for 45 minutes. The specimens were then removed, dabbed dry on the surface with a tissue, and then weighed. Bubble pressure of the wick filled specimens was then measured to evaluate their performance as wet seals. The specimens were placed in a test fixture with o-ring seals and gas pressure (nitrogen) was applied to one surface. Pressure was applied in 5 kPa increments until gas bubbles were observed exiting the surface opposed to the surface exposed to pressurized surface. The highest pressure application without gas bubble breakthrough was recorded as the bubble pressure. To determine the ultimate water fill levels, the specimens were put back in water-filled beakers, and placed under a vacuum. Vacuum was cycled two times in an attempt to backfill any remaining porosity. The specimens were removed, dabbed dry, and the weights were recorded.

Improved wetting, bubble pressure and electrical resistivity characteristics of the first, second and third test examples compared to the baseline example are shown in TABLE 1.

TABLE 1

| Property MODIFIED CARBON BLACK-% | Baseline Test Example 0 | First Test Example 2.5 | Second Test Example 5 | Third Test Example 10 |
|---|---|---|---|---|
| Weight Gain After Wick Fill, % | 0.8, 0.9 | 13, 14 | 20, 22 | 20 |
| Weight Gain After Vacuum Fill, % | 18, 15 | 16, 18 | 25, 27 | 25 |
| Wick Fill/Vacuum Fill, Ratio | 0.04–0.05 | 0.81–0.82 | 0.80–0.81 | 0.80 |
| Bubble Pressure After Wick Fill, kPa | <5 | 85, 85 | 70, 65 | 95 |
| Through-Plane Electrical Resistivity, ohm-cm | 0.11 0.11 | 0.10 0.09 | 0.12 0.12 | 0.10 |
| Flexural Strength, MPa | 22.9 | 20.6 | — | — |

It is pointed out that for the baseline, first and second test examples, two specimens were utilized in the "Weight Gain After Wick Fill", "Weight Gain After Vacuum Fill", "Wick Fill/Vacuum Fill", "Bubble Pressure After Wick Fill" and "Through-Plane Electrical Resistivity Tests", and hence two data entries are made in each block of Table 1 for each of the two specimens. Only one specimen was utilized for the third test example in all tests, and only one specimen of each of the baseline, first, second and third test examples was utilized for the "Flexural Strength" test, and therefore, only one data entry is made in each block for those tests.

As is apparent, water pick-up amounts after wick filling are much higher for the first, second third test examples that include the modified carbon black electronically conductive hydrophilic agent than for the baseline example having no modified carbon black. A ratio of wick fill to vacuum fill is included in TABLE 1, and it shows a ratio of approximately 0.80 for the test examples including the modified carbon black, as opposed to less than 0.05 for the baseline example. That substantial benefit in increased wick fill of the first, second and third examples results in a much more effective wet seal as shown by the bubble pressure results listed in TABLE 1. In addition, electrical resistivity for the first second and third examples is about equivalent to or better than the baseline example. Finally, the flexural strength of the first example having the modified carbon black is at an acceptable level that is almost as high as the baseline example.

Figure 2:
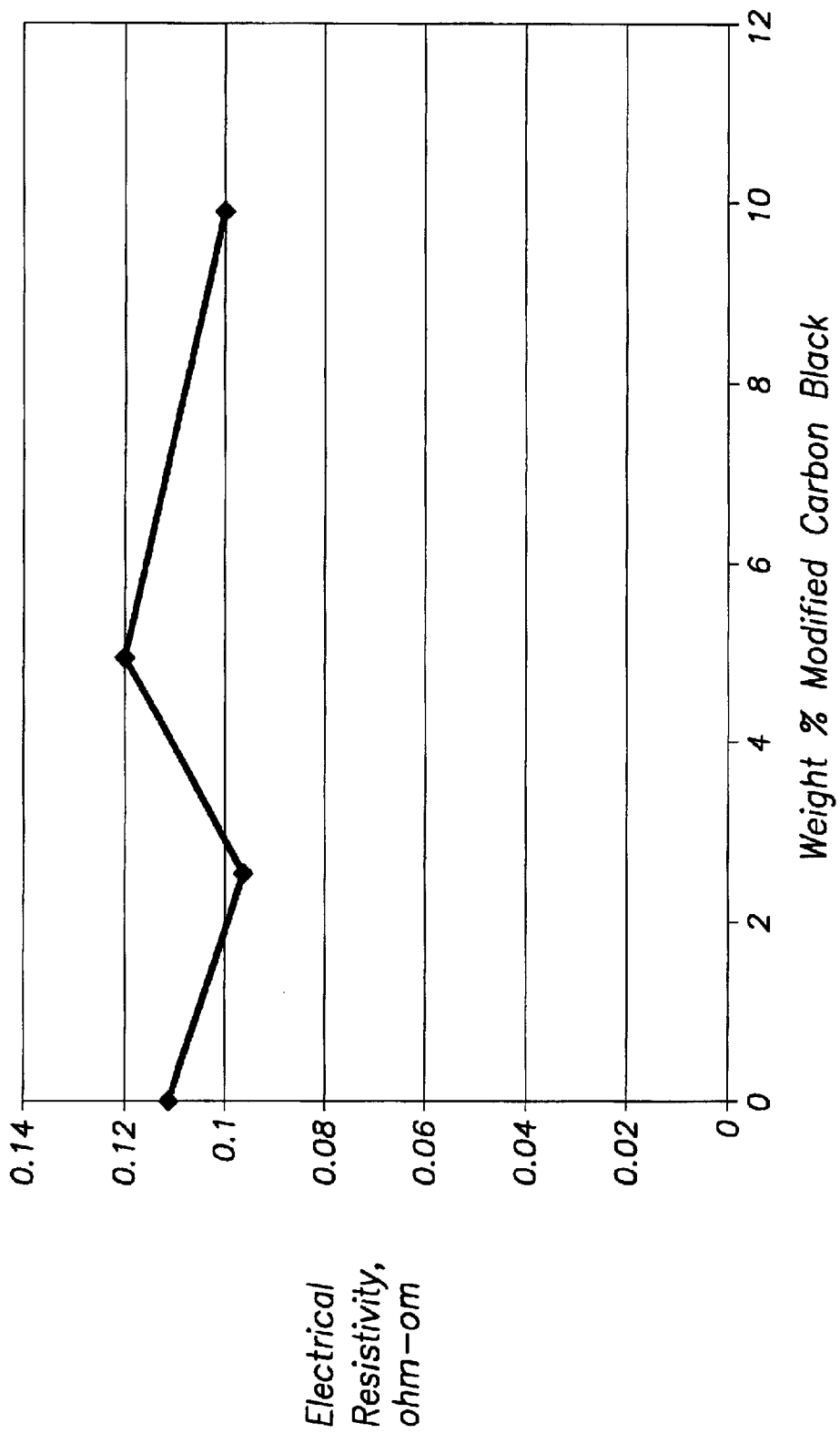
FIG. 2 is a graph showing stability of electrical resistivity for a porous carbon body as a function of increasing weight percent amounts of a modified carbon black electronically conductive hydrophilic agent.
Figure 3:
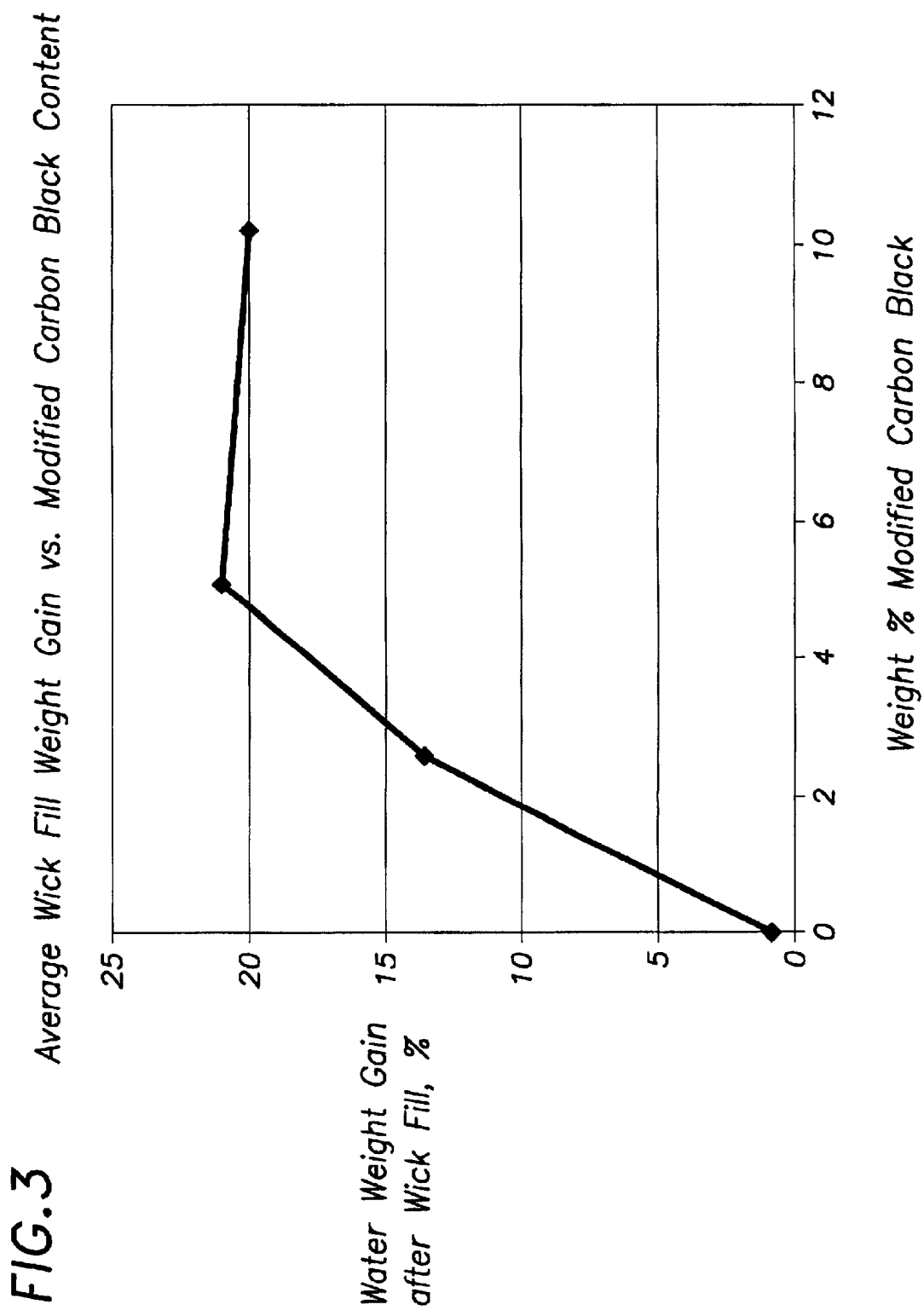
FIG. 3 is a graph showing water weight gain through wick filling of a porous carbon body as a function of increasing weight percent amounts of a modified carbon black electronically conductive hydrophilic agent.

The data shown in Table 1 with respect to the specimens utilized in the "Through-Plane Electrical Resistivity" test for the baseline, first, second and third test examples are plotted on the FIG. 2 graph to emphasize the highly desirable benefit of no significant change in electrical resistivity (and hence in electrical conductivity) as the weight percent of the modified carbon black electronically conductive hydrophilic agent ranges from 0 wt % to 10 wt %. Similarly, in the FIG. 3 graph, the data from Table 1 with respect to the "Weight Gain After Wick Fill" test are plotted to highlight the dramatic increase in water uptake from the 0 wt % to the 2.5 wt %, to the 5 wt % and to the 10 wt % of the modified carbon black electronically conductive hydrophilic agent. It is clear from the FIGS. 2 and 3 graphs that the porous carbon bodies having modified carbon black of the present invention represent a substantial improvement over known porous carbon bodies for use in fuel cells. Because the through-plane electrical resistivity remains basically unchanged as increasing amounts of the modified carbon black are added to the body, an adequate amount of the modified carbon black may be added to achieve a desired wettability without the compromise of known porous carbon bodies of decreasing electrical conductivity.

In a preferred embodiment, the porous carbon body also has a bubble pressure of greater than 5 pounds per square inch ("p.s.i."), a liquid water permeability of greater than $10 \times 10^{-16}$ square meters, a mean pore size of greater than 2.0 microns, and an open porosity of greater than 25%. By the phrase "mean pore size", it is meant that the measurement of "greater than 2.0 microns" is measuring mean widest diameters across the pores. By the phrase "open porosity", it is meant that the pores are open to flow of fluids through a plane defined by a longest axis of the body within the pores, as opposed to sealed pores that cannot permit through flow. For example a "through plane" flow of product water through the cathode water transport plate 14 in FIG. 1 means flow in a direction from the cathode substrate layer 28 to the cathode coolant channels 42A, 42B, 42C, and a through-plane flow of coolant water is in a direction from the cathode coolant channels 42A, 42B, 42C to the cathode substrate layer It is pointed out that a preferred embodiment of this invention includes a porous carbon body having an electronically conductive graphite powder in an amount of between 60%–80% by weight of the body; a carbon fiber in an amount of between 5%–15% by weight of the body; a thermoset binder in an amount of between 6%–18% by weight of the body; and, a modified carbon black electronically conductive hydrophilic agent in an amount of between 2%–20% by weight of the body; wherein the body has a mean pore size of greater than 2.0 microns, and an open porosity of greater than 25% of the body. As described above, the favorable porosity and mean pore size may be produced by the simultaneous compression and heating of the graphite powder, carbon fiber, thermoset resin and modified carbon black.

Alternative embodiments may also be fabricated for particular uses wherein the carbon fibers are not included, and instead, a greater weight percent of graphite powder is utilized. Such an alternative preferred embodiment of this invention includes a porous carbon body having an electronically conductive hydrophilic agent for use in an electrochemical cell having an electronically conductive graphite powder in an amount of between 67%–87% by weight of the body, a thermoset binder in an amount of between 6%–18% by weight of the body, and a modified carbon black electronically conductive hydrophilic agent in an amount of between 2%–20% by weight of the body, the modified carbon black being carbon having attached at least one organic group, the organic group comprising i.) at least one aromatic group or a $C_1$–$C_{12}$ alkyl group, and ii.) at least one ionic group, one ionizable group, or a mixture of an ionic group and an ionizable group wherein the ionic or the ionizable group is a sulfonic acid or a salt thereof, wherein the at least one aromatic group or $C_1$–$C_{12}$ alkyl of the organic group is directly attached to the carbon, and the organic group is present at a level of from about 0.10 to about 4.0 micromoles/m$^2$ of the carbon used based on the nitrogen surface area of the carbon.

Other thermoset binders may be used in place of the aforesaid phenolic resin. Suitable materials are vinyl esters available from the Dow Chemical Co., of Midland, Mich., U.S.A. or the Reichold Chemical Co., of Niagra Falls, N.Y., U.S.A.; epoxies available from the aforesaid Dow Chemical Co.; diallylphthalates, available from the Rogers Corporation of Manchester, Conn., U.S.A.; and urethanes available from the Lord Corporation of Erie, Penn., U.S.A.

In the aforesaid preferred embodiments, by use of the thermoset resin mixed with the modified carbon black, graphite powder and carbon fibers, the porous carbon body as described achieves long term chemical stability for operation in a PEM fuel cell operating up to 1,000–2,000 amps per square foot ("ASF"), without any need for time consuming and costly high temperature treatments to graphitize the body, or post-molding treatments to incorporate hydrophilic agents. The porous carbon body resulting from the described efficient manufacturing process also exhibits appropriate bubble pressure, water permeability, electrical conductivity, thermal conductivity, compressive and flexural strength to efficiently serve as a water transport plate, separator plate or related component of a PEM fuel cell operating at 1,000–2,000 ASF for a very long duration.

While the present invention has been described and illustrated with respect to particular embodiments and methods of manufacture of a porous carbon body for use in a fuel cell 10, it is to be understood that the present invention is not to be limited to the described and illustrated embodiment. For example, the porous carbon body of the present invention may also be utilized in other electrochemical cells, such as in electrolysis cells. Further, although FIG. 1 shows schematically a single fuel cell including two porous carbon bodies of the present invention in the form of the anode and cathode water transport plate 12, 14 components, the invention includes application of the porous carbon body as differing fuel cell components such as separator plates, support plates, end plates, etc., and the invention also contemplates usage of the porous carbon body in a plurality of fuel cells cooperatively secured in a well known fuel cell stack. Accordingly, reference should be made primarily to the following claims rather than the foregoing description to determine the scope of the invention.

What is claimed is:

1. A porous carbon body having an electronically conductive hydrophilic agent for use in an electrochemical cell, the body comprising:

a. an electronically conductive graphite powder in an amount of between 67%–87% by weight of the body;

b. a thermoset binder in an amount of between 6%–18% by weight of the body; and, c. a modified carbon black electronically conductive hydrophilic agent in an amount of between 2%–20% by weight of the body, the modified carbon black being carbon having attached at least one organic group, the organic group comprising i.) at least one aromatic group or a $C_1$–$C_{12}$ alkyl group, and ii.) at least one ionic group, one ionizable group, or a mixture of an ionic group and an ionizable group wherein the ionic or the ionizable group is a sulfonic acid or a salt thereof, wherein the at least one aromatic group or $C_1$–$C_{12}$ alkyl of the organic group is directly attached to the carbon, and the organic group is present at a level of from about 0.10 to about 4.0 micromoles/m$^2$ of the carbon used based on the nitrogen surface area of the carbon.

2. The porous carbon body of claim 1, wherein the body has a mean pore size of greater than 2.0 microns, and an open porosity of greater than 25% of the body.

3. The porous carbon body of claim 1, wherein the body has a bubble pressure of greater than 5 pounds per square inch.

4. The porous carbon body of claim 1, wherein the thermoset binder is a thermoset binder selected from the group consisting of a phenolic resin, a vinyl ester resin, an epoxy resin, a diallylphthalate resin, and a urethane resin.

5. The porous carbon body of claim 1, wherein the pores of the body are sufficiently hydrophilic to wick fill to greater than 70% of a vacuum filled level.

6. A porous carbon body having an electronically conductive hydrophilic agent for use in an electrochemical cell comprising:

a. an electronically conductive graphite powder in an amount of between 60%–80% by weight of the body;

b. a carbon fiber in an amount of between 5%–15% of the body;

c. a thermoset binder in an amount of between 6%–18% by weight of the body;

d. a modified carbon black electronically conductive hydrophilic agent in an amount of between 2%–20% by weight of the body, the modified carbon black being carbon having attached at least one organic group, the organic group comprising i.) at least one aromatic group or a $C_1$–$C_{12}$ alkyl group, and ii.) at least one ionic group, one ionizable group, or a mixture of an ionic group and an ionizable group wherein the ionic or the ionizable group is a sulfonic acid or a salt thereof, wherein the at least one aromatic group or $C_1$–$C_{12}$ alkyl of the organic group is directly attached to the carbon, and the organic group is present at a level of from about 0.10 to about 4.0 micromoles/m$^2$ of the carbon used based on the nitrogen surface area of the carbon.

7. The porous carbon body of claim 6 wherein the body has a mean pore size of greater than 2.0 microns, and an open porosity of greater than 25% of the body.

8. The porous carbon body of claim 6, wherein the body has a bubble pressure of greater than 5 pounds per square inch.

9. The porous carbon body of claim 6, wherein the thermoset binder is a thermoset binder selected from the group consisting of a phenolic resin, a vinyl ester resin, an epoxy resin, a diallylphthalate resin, and a urethane resin.

10. The porous carbon body of claim 6, wherein the pores of the body are sufficiently hydrophilic to wick fill to grater than 70% of a vacuum filled level.

11. A method of forming a porous carbon body having an electronically conductive hydrophilic agent for use in an electrochemical cell, the method comprising the steps of:

a. mixing together an electronically conductive graphite powder in an amount of between 67%–87% by weight of the mixture, a thermoset binder in an amount of between 6%–18% by weight of the mixture, and a modified carbon black electronically conductive hydrophilic agent in a amount of between 2% and 20% by weight of the mixture, the modified carbon black being carbon having attached at least one organic group, the organic group comprising i.) at least one aromatic group or a $C_1$–$C_{12}$ alkyl group, and ii.) at least one ionic group, one ionizable group, or a mixture of an ionic group and an ionizable group wherein the ionic or the ionizable group is a sulfonic acid or a salt thereof, wherein the at least one aromatic group or $C_1$–$C_{12}$ alkyl of the organic group is directly attached to the carbon, and the organic group is present at a level of from about 0.10 to about 4.0 micromoles/m$^2$ of the carbon used based on the nitrogen surface area of the carbon; and, b. then simultaneously compressing and heating the mixture in a mold at a pressure of between 250–1,000 pounds per square inch and at a temperature of between 300–450 degrees Fahrenheit to form a body having a mean pore size of greater than 2.0 microns and an open porosity of greater than 25%.

12. The method of claim 11, wherein the mixing together step further comprises mixing with the electronically conductive graphite powder, thermoset binder, and modified carbon black, a carbon fiber in an amount of between 5%–15% by weight of the mixture.

* * * * *